(12) United States Patent
Kume

(10) Patent No.: US 8,811,025 B2
(45) Date of Patent: Aug. 19, 2014

(54) CONNECTOR

(75) Inventor: Kenta Kume, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 175 days.

(21) Appl. No.: 13/599,455

(22) Filed: Aug. 30, 2012

(65) Prior Publication Data

US 2013/0050964 A1 Feb. 28, 2013

(30) Foreign Application Priority Data

Aug. 31, 2011 (JP) ................................ 2011-188672

(51) Int. Cl.
*H05K 5/00* (2006.01)

(52) U.S. Cl.
USPC ........................................................ 361/754

(58) Field of Classification Search
CPC ........ H05K 7/1409; G06F 1/184; G06F 1/185
USPC ........................................................ 361/754
See application file for complete search history.

(56) References Cited

U.S. PATENT DOCUMENTS

| | | | |
|---|---|---|---|
| 6,547,608 B2 * | 4/2003 | Sato et al. ...................... | 439/852 |
| 6,992,900 B1 * | 1/2006 | Suzue et al. ................... | 361/801 |
| 7,012,813 B2 * | 3/2006 | Wang et al. .................... | 361/801 |
| 7,023,704 B1 * | 4/2006 | Zarnowitz et al. ............. | 361/754 |
| 7,252,561 B2 * | 8/2007 | Nora et al. ..................... | 439/852 |
| 2006/0028805 A1 * | 2/2006 | Hidaka .......................... | 361/754 |
| 2008/0165508 A1 | 7/2008 | Wang et al. | |
| 2009/0267677 A1 | 10/2009 | Myers et al. | |
| 2012/0195013 A1 * | 8/2012 | Trzaskos et al. .............. | 361/754 |

FOREIGN PATENT DOCUMENTS

| | | |
|---|---|---|
| JP | 50-75088 | 11/1948 |
| JP | 59-17570 U | 2/1984 |
| JP | 63-232280 A | 9/1988 |
| JP | 5-87837 U | 11/1993 |
| JP | 8-124633 A | 5/1996 |
| JP | 8-162194 A | 6/1996 |
| JP | 2000-21516 A | 1/2000 |
| JP | 2002-63961 A | 2/2002 |
| JP | 2002-298964 A | 10/2002 |
| JP | 2004-281207 A | 10/2004 |

(Continued)

OTHER PUBLICATIONS

Office Action (in English and Japanese) dated Aug. 9, 2012 issued in Appln. Serial No. 2010-222461.

*Primary Examiner* — Forrest M Phillips
(74) *Attorney, Agent, or Firm* — Holtz Holtz Goodman & Chick PC

(57) ABSTRACT

A connector ejects a tray along an eject direction opposite to an insert direction along which the tray is inserted. The connector comprises an eject bar movable along the insert direction, a lock portion movable in a width direction perpendicular to the insert direction, and a stopper. The lock portion moves along the insert direction when the eject bar moves along the insert direction. When the inserted tray is pulled along the eject direction, the tray is brought into abutment with the lock portion. The lock portion in the abutment moves in the width direction to be stopped by the stopper so that the tray is prevented from being ejected. When the eject bar is moved along the insert direction, the lock portion is brought into abutment with the tray. In this case, the lock portion moves in the width direction without being stopped so that the tray is ejected.

20 Claims, 12 Drawing Sheets

(56) References Cited

FOREIGN PATENT DOCUMENTS

| | | |
|---|---|---|
| JP | 2007-184156 A | 7/2007 |
| JP | 2009-105011 A | 5/2009 |
| JP | 2010-55880 A | 3/2010 |
| JP | 2010-129307 A | 6/2010 |

* cited by examiner

CONNECTOR

CROSS REFERENCE TO RELATED APPLICATIONS

Applicants claim priority under 35 U.S.C. §119 of Japanese Patent Applications No. JP2011-188672 filed Aug. 31, 2011.

BACKGROUND OF THE INVENTION

This invention relates to a connector connectable to a card such as a Subscriber Identity Module (SIM) card.

Generally, this type of connector has an eject mechanism in order to eject an object (for example, a card or a tray accommodating a card) from the connector. For example, the aforementioned connector is disclosed in JP-A 2010-129307, US 2009/0267677A or US 2008/0165508A, contents of which are incorporated herein by reference.

The connector of JP-A 2010-129307 comprises an eject mechanism and a receiving portion (see FIG. 20). The eject mechanism comprises of a moving portion, a cam follower and a coil spring. The moving portion is provided with a heart cam, a lock portion and a received portion. When a card is inserted into the connector, the moving portion, together with the card, moves to be held at a hold position (a position shown in FIG. 20). When the moving portion held at the hold position is pulled, the received portion is received and stopped by the receiving portion so that the card is prevented from being forcibly removed. When the card is pushed into the connector, the moving portion is released from the hold position to be urged by the coil spring so that the card is ejected.

In addition to the aforementioned eject mechanism, another type of eject mechanism is used. For example, an electronic apparatus disclosed in US 2009/0267677A comprises a connector and an eject mechanism (see FIG. 21). The electronic apparatus and a tray are formed with holes corresponding to each other. A part of the eject mechanism is pushed by a pin inserted through the holes so that the tray inserted in the connector is ejected. An electronic apparatus disclosed in US 2008/0165508A comprises a holding member in addition to an eject mechanism similar to the eject mechanism of US 2009/0267677A (see FIG. 22). The holding member is configured to hold a tray by a resilient force.

However, a relatively large number of members is necessary to form the eject mechanism disclosed in JP-A 2010-129307. Although the eject mechanism disclosed in US 2009/0267677A or US 2008/0165508A is able to be formed from a relatively small number of members, the eject mechanism is formed not in the connector but at the outside of the connector. Moreover, the electronic apparatus of US 2009/0267677A holds the inserted tray only by a friction force. Accordingly, if the electronic apparatus (especially, the electronic apparatus of US 2009/0267677A) falls to the ground, the impact might easily remove the tray from the electronic apparatus. The holding member of the electronic apparatus of US 2008/0165508A is engaged with a cut formed on the tray when the tray is inserted in the connector. This engagement (i.e. the resilient force of the holding member) holds the tray. Accordingly, the tray may be held more securely by increasing the resilient force. However, a large force may be necessary to push the pin to eject the tray if the resilient force is so strong as to hold the tray securely. On the other hand, if the resilient force is weak, the tray may be easily removed by an impact.

SUMMARY OF THE INVENTION

It is therefore an object of the present invention to provide a connector which is able to hold an object more securely and eject the object by a relatively small force while the connector comprises an eject mechanism which has a relatively small number of members.

One aspect of the present invention provides a connector into which an object having an ejection-prevent portion is insertable along an insert direction toward a rear end of the connector. The connector is ejectable the object along an eject direction opposite to the insert direction. The connector comprises an eject bar movable along the insert direction, an eject lever configured to be operated by the eject bar, a lock portion movable in a width direction perpendicular to the insert direction, and a stopper. When the eject bar moves along the insert direction, the lock portion moves along the insert direction from a lock position where the lock portion faces the stopper in the width direction to an unlock position which is between the stopper and the rear end of the connector in the insert direction. When the object is in an inserted state where the object is inserted in the connector, the ejection-prevent portion of the object is located between the lock portion and the rear end of the connector in the insert direction. When the object in the inserted state is moved along the eject direction without operating the eject bar, the ejection-prevent portion is brought into abutment with the lock portion, the abutment moves the lock portion in the width direction, and the moved lock portion is received and stopped by the stopper so that the object is prevented from being ejected. When the eject bar is moved along the insert direction under the inserted state, the eject lever presses and moves the object in the eject direction while the lock portion moves toward the unlock position to be brought into abutment with the ejection-prevent portion, and the lock portion in abutment with the ejection-prevent portion moves in the width direction without being stopped by the stopper so that the object is ejected.

An appreciation of the objectives of the present invention and a more complete understanding of its structure may be had by studying the following description of the preferred embodiment and by referring to the accompanying drawings.

Figure 1:
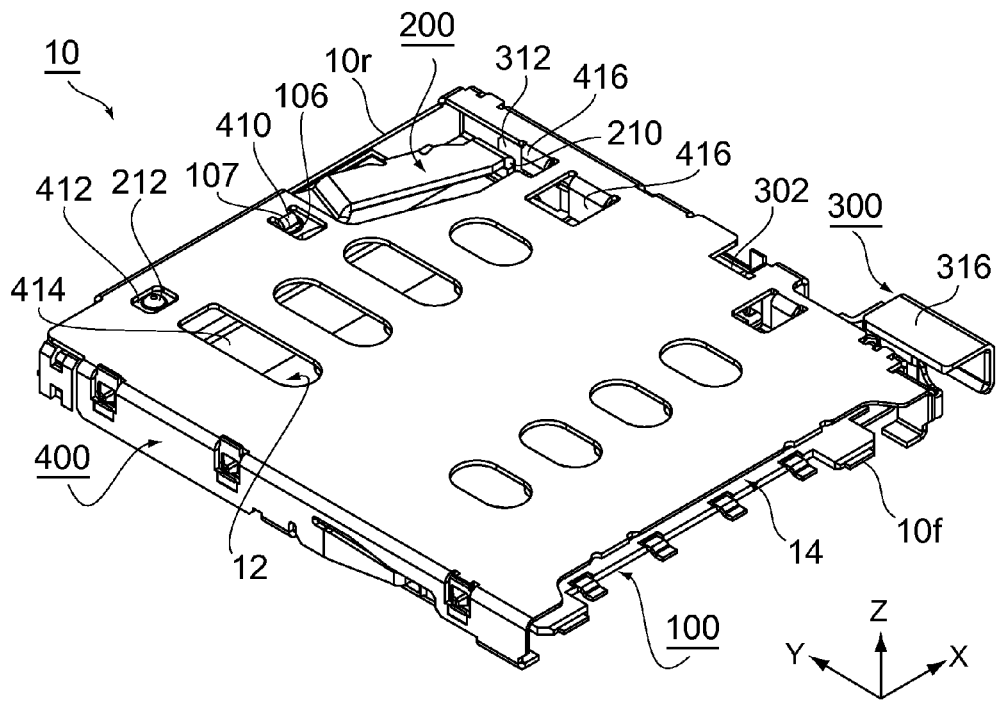
FIG. 1 is a perspective view showing a connector according to an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 3:
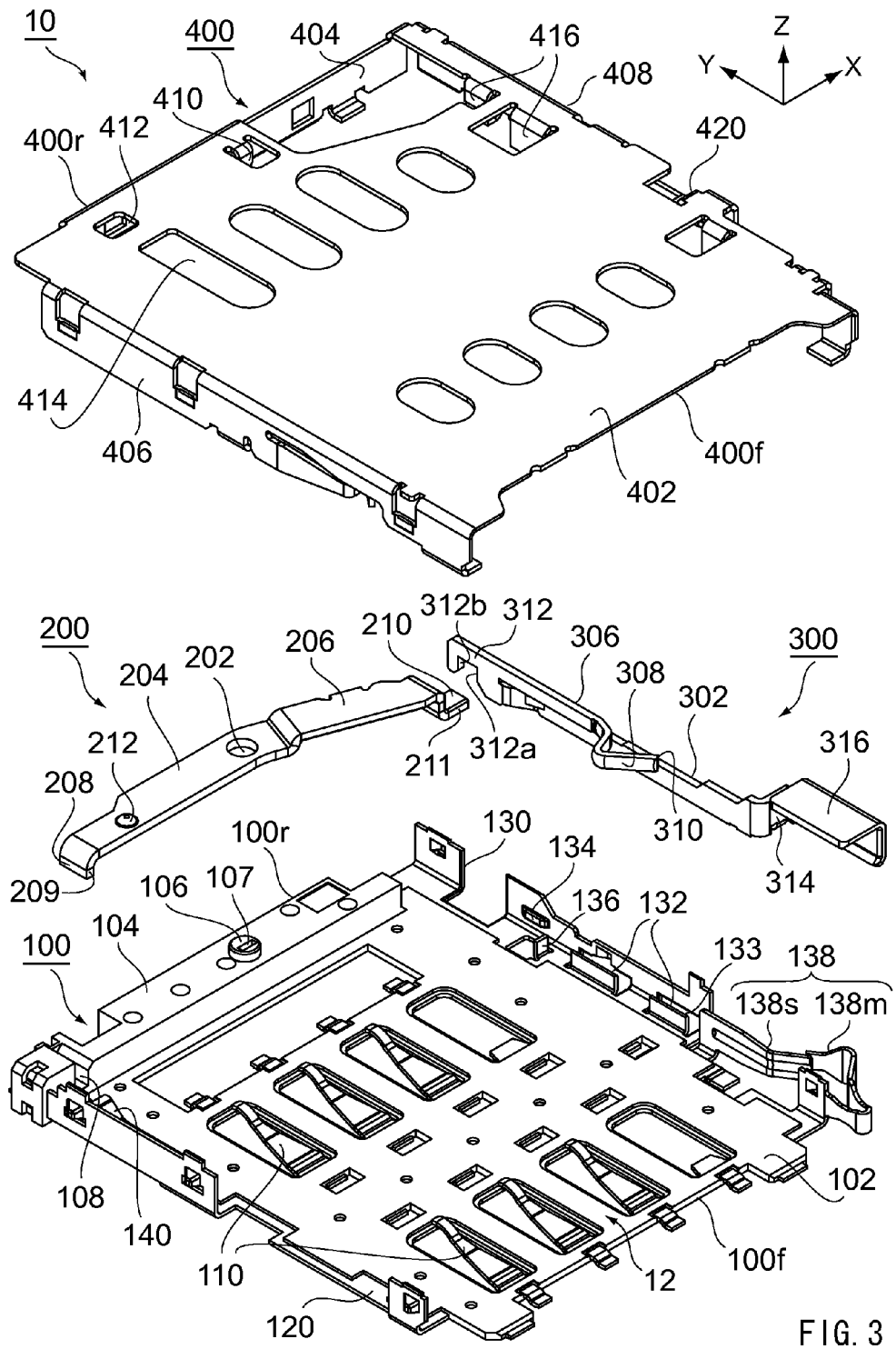
FIG. 3 is a partially exploded, perspective view showing the connector of FIG. 1.

As shown in FIGS. 1 and 3, the connector 10 according to an embodiment of the present invention is able to be installed, for example, in a cellular phone. The connector 10 comprises a housing 100, an eject lever 200 made of a metal, an eject bar 300 made of a metal and a cover 400 made of a metal. The connector 10 further comprises an accommodating portion 12. The accommodating portion 12 is formed between the housing 100 and the cover 400 in the Z-direction (upper-to-lower direction). The connector 10 has a front end 10f and a rear end 10r at opposite ends in the Y-direction (insert/eject direction) of the connector 10, respectively. The connector 10 is formed with an opening 14 at the front end 10f of the connector 10. The opening 14 communicates with the accommodating portion 12.

Figure 2:
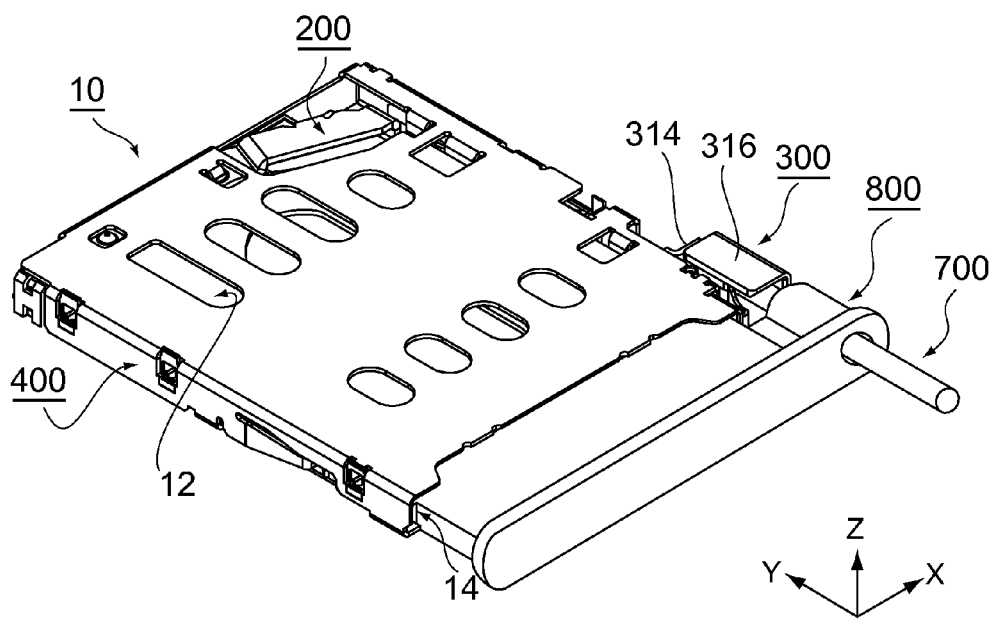
FIG. 2 is a perspective view showing the connector of FIG. 1 under an inserted state where a tray is inserted.
Figure 4:
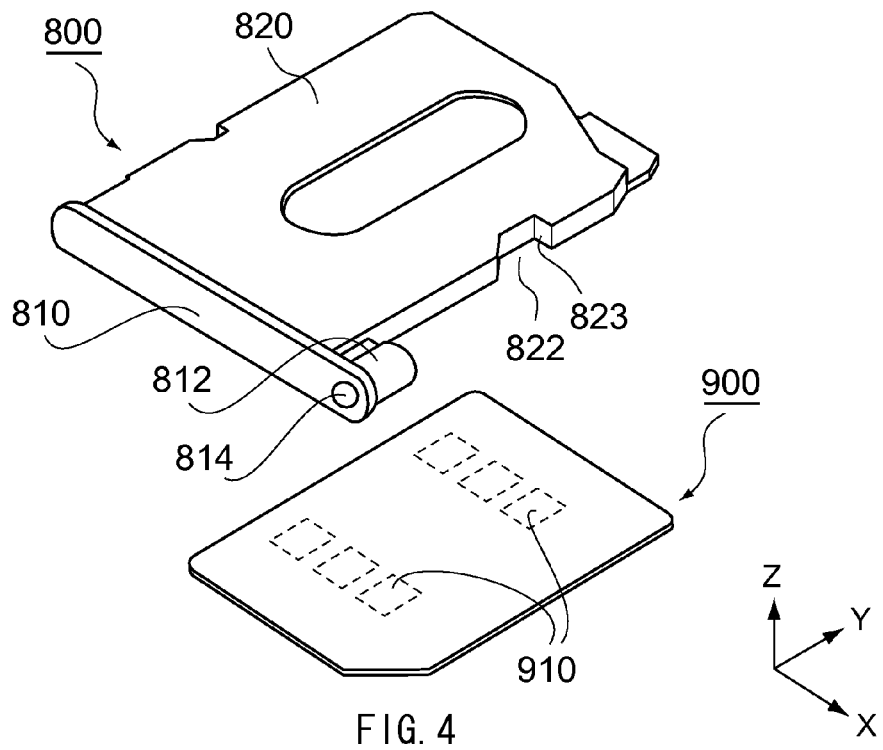
FIG. 4 is a perspective view showing the tray insertable into the connector of FIG. 1 and a card mountable on the tray, wherein electro nodes formed on the back of the card are illustrated by dashed lines.

As can be seen from FIGS. 1, 2 and 4, a tray (object) 800 is insertable into the connector 10 along the positive Y-direction (insert direction) toward the rear end 10r. The tray 800 is accommodated in the accommodating portion 12 when inserted in the connector 10. In other words, the accommodating portion 12 according to the present embodiment is configured to accommodate the tray 800 under an inserted state where the tray 800 is inserted in the connector 10. The connector 10 is ejectable the tray 800 along the negative Y-direction (eject direction opposite to the insert direction). More specifically, according to the present embodiment, the tray 800 in the inserted state is ejected from the connector 10 when the eject bar 300 is pressed by a pin 700 having a cylindrical shape.

As shown in FIG. 4, the tray 800 according to the present embodiment comprises a front wall 810, a card-holding portion 820 and a tube portion 812. The front wall 810 extends long in the X-direction (width direction). The card-holding portion 820 extends in the positive Y-direction from the front wall 810. The tube portion 812 is formed on the positive X-side end of the front wall 810 so as to extend in the positive Y-direction. The tray 800 is formed with a guide hole 814 which pierces the front wall 810 and the tube portion 812 in the Y-direction. The guide hole 814 has an internal diameter which allows the pin 700 to pass through the guide hole 814. The tray 800 has a recess 822 formed on a side (according to the present embodiment, the positive X-side) thereof in the X-direction. The recess 822 is recessed in the negative X-direction so that the tray 800 is formed with a wall (ejection-prevent portion) 823 located at far side of the recess 822 in the positive Y-direction. The wall 823 has a planar shape perpendicular to the Y-direction. The planar surface of the wall 823 faces toward the front wall 810 in the Y-direction. Thus, the recess 822 is located between the guide hole 814 and the wall 823 in the Y-direction.

As can be seen from FIG. 4, a card 900 (for example, a SIM card) according to the present embodiment is mounted on and held by the negative Z-side (i.e. lower side) of the card-holding portion 820. The card 900 according to the present embodiment has six electro nodes 910 formed on a lower surface of the card 900.

Figure 6:
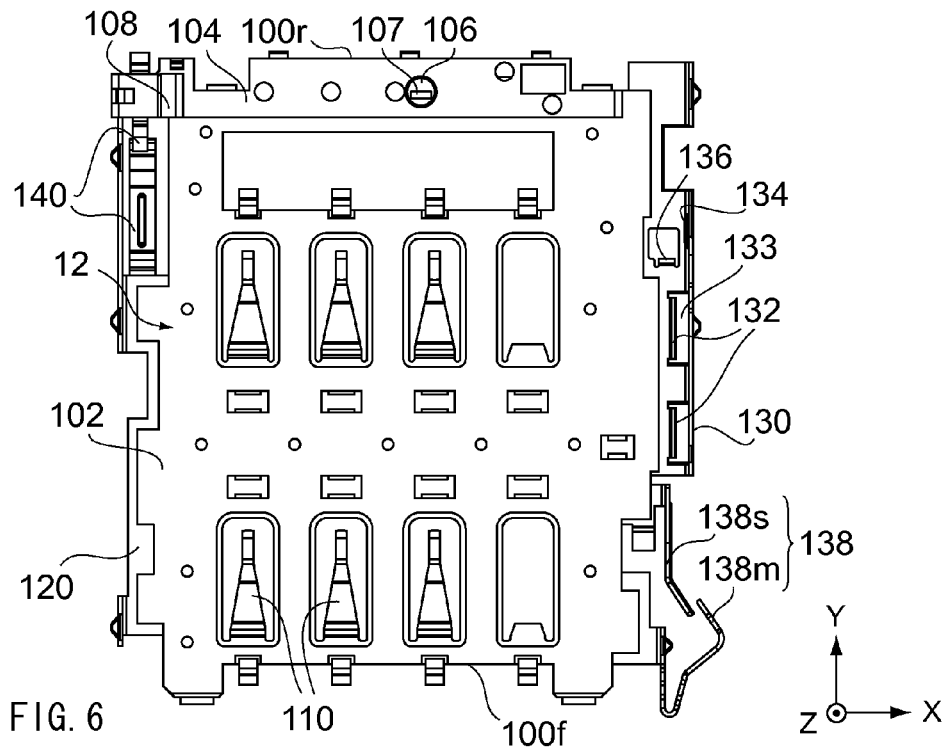
FIG. 6 is a top view showing a housing of the connector of FIG. 1.
Figure 7:
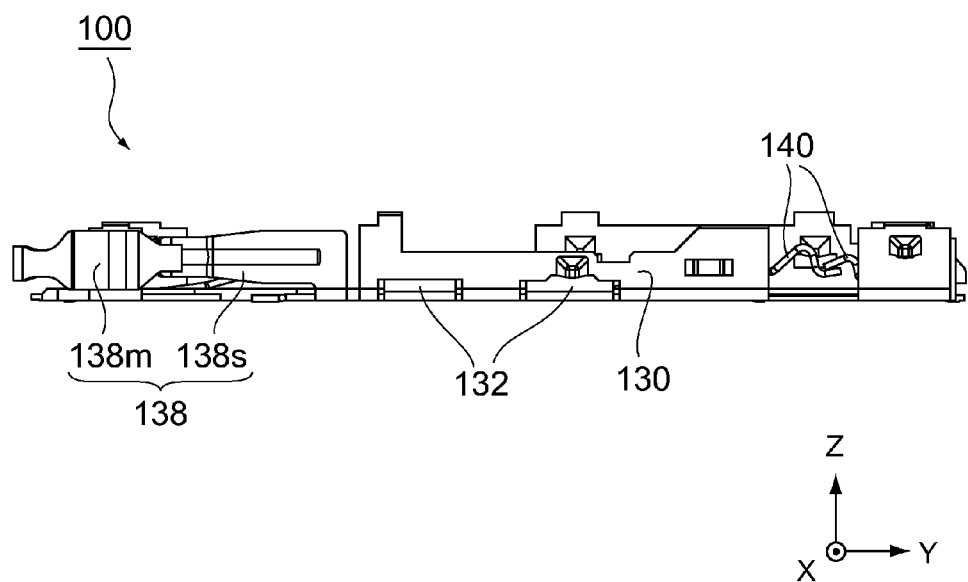
FIG. 7 is a side view showing the housing of FIG. 6.

As shown in FIGS. 3, 6 and 7, the housing 100 extends in both the X-direction and the Y-direction so as to have a front end 100f and a rear end 100r at opposite ends in the Y-direction. The housing 100 is formed by insert-molding some members into an insulating resin. Each of the insert-molded members is made of a metal (i.e. for example, a phosphor bronze) which is softer than the cover 400. In detail, the housing 100 comprises a bottom-plate portion 102 made of an insulating resin, six contacts 110 each made of the metal, a first side plate 120 made of the metal, a second side plate 130 made of the metal, a first switch 138 made of the metal and a second switch 140 made of the metal.

The bottom-plate portion 102 is provided with a rear wall 104. The rear wall 104 is formed in the vicinity of the rear end 100r of the bottom-plate portion 102. The rear wall 104 extends long in the X-direction while protruding in the positive Z-direction (i.e. upward) so as to have a rectangular bar-like shape. The rear wall 104 is provided with a pivot portion 106 at a middle part thereof in the X-direction. The pivot portion 106 has a cylindrical shape which protrudes upward. The pivot portion 106 is formed with an engaging slot 107 on an upper surface thereof. The engaging slot 107 is depressed in the negative Z-direction (i.e. downward). The rear wall 104 has a ditch 108 formed in the vicinity of the negative X-side end of the rear wall 104. The ditch 108 extends in the Y-direction so as to have opposite ends (i.e. a front end and a rear end) while being depressed downward. The front end (i.e. the end nearer to the front end 100f) of the ditch 108 communicates with the accommodating portion 12. The rear end (i.e. the end nearer to the rear end 100r) of the ditch 108 is blocked by a part of the rear wall 104.

Figure 5:
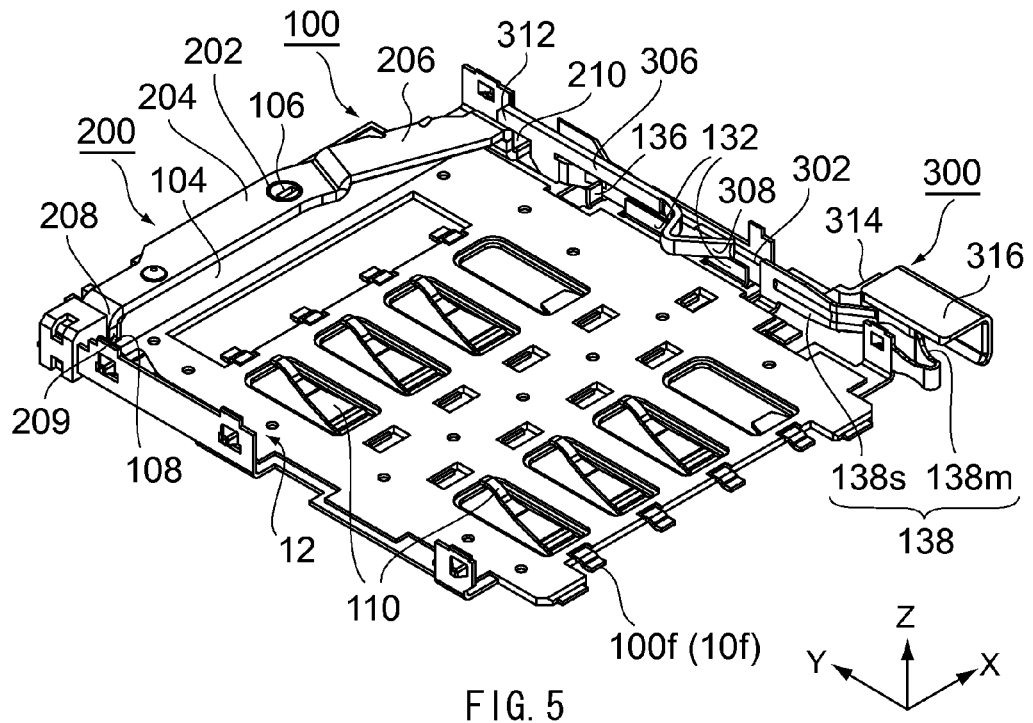
FIG. 5 is a perspective view showing the connector of FIG. 1 in a state where a cover of the connector is detached.

As can be seen from FIGS. 2, 4 and 5, the six contacts 110 correspond to the six electro nodes 910 of the card 900, respectively. More specifically, the contacts 110 are arranged at positions where the contacts 110 are brought into contact with the electro nodes 910 of the card 900 which is mounted on the tray 800 in the inserted state, respectively. In other words, the connector 10 and the card 900 are electrically connected with each other when the tray 800 is in the inserted state. The contacts 110 or the electro nodes 910 may be provided differently, provided that the connector 10 and the card 900 are electrically connectable with each other.

As shown in FIG. 3 and 6, the first side plate 120 and the second side plate 130 are located at the negative and positive X-side ends of the bottom-plate portion 102, respectively. Each of the first side plate 120 and the second side plate 130 is bent at an end in the X-direction to extend upward so that the housing 100 is formed with opposite side surfaces (i.e. a positive X-side surface and a negative X-side surface) which face each other in the X-direction.

The second side plate 130 is formed with two guide portions 132, a first temporally holding portion (temporally holding portion) 134 and a first regulating portion 136. In detail, the second side plate 130 is formed with two cut parts. Each of the cut part is bent to extend in parallel to the Y-direction so that the guide portion 132 is formed. The two guide portions 132 are arranged at the same position in the X-direction. The guide portions 132 extend in parallel to the positive X-side surface of the housing 100 so that the housing 100 is formed with a guide channel 133. The guide channel 133 extends in the Y-direction between the guide portions 132 and the positive X-side surface of the housing 100. The first temporally holding portion 134 protrudes in the negative X-direction from the positive X-side surface of the housing 100 so as to block off a part of the guide channel 133. A part of the second side plate 130 is cut and bent so that the first regulating portion 136 is formed. The first regulating portion 136 has a planar shape perpendicular to the Y-direction.

As shown in FIGS. 3, 6 and 7, the first switch 138 is comprised of a fixed portion 138s and a movable portion 138m. The fixed portion 138s and the movable portion 138m are arranged at the positive X-side end of the bottom-plate portion 102. Each of the fixed portion 138s and the movable portion 138m has a curved planar shape parallel to the Z-direction. In detail, the movable portion 138m extends in the negative Y-direction (i.e. forward) from the vicinity of the front end 100f of the bottom-plate portion 102. Then, the movable portion 138m extends in the positive Y-direction (i.e. rearward) so as to have a tip (free end) while forming a bulge which bulges toward the outside of the housing 100. The fixed portion 138s extends from a position which is nearer to the rear end 100r than the movable portion 138m. The fixed portion 138s extends forward so as to have a tip portion while inclining toward the outside of the housing 100. The tip of the movable portion 138m is located outward of the fixed portion 138s in the X-direction. As seen along the negative X-direction, the tip of the movable portion 138m overlaps with the tip portion of the fixed portion 138s (see FIG. 7).

The second switch 140 is arranged at the negative X-side end of the bottom-plate portion 102. The second switch 140 has a curved planar shape parallel to the X-direction. In detail, the second switch 140 is comprised of a first part and a second part. The first part extends forward from the vicinity of the rear end 100r so as to have a tip. The second part extends from a position which is nearer to the front end 100f than the first part. The second part extends rearward so as to have a tip. As seen along the negative Z-direction, the tip of the first part overlaps with the tip of the second part. According to the present embodiment, the first part and the second part are in contact with each other when the tray 800 is not inserted in the connector 10.

As shown in FIGS. 3 and 5, the eject lever 200 according to the present embodiment is attached on the rear wall 104 of the housing 100. The eject lever 200 has a board-like shape extending roughly in the X-direction. In detail, the eject lever 200 has a first arm 204 and a second arm 206. The first arm 204 extends in the X-direction. The second arm 206 extends in the XY-plane so as to intersect the first arm 204 at an obtuse angle.

Figure 8:
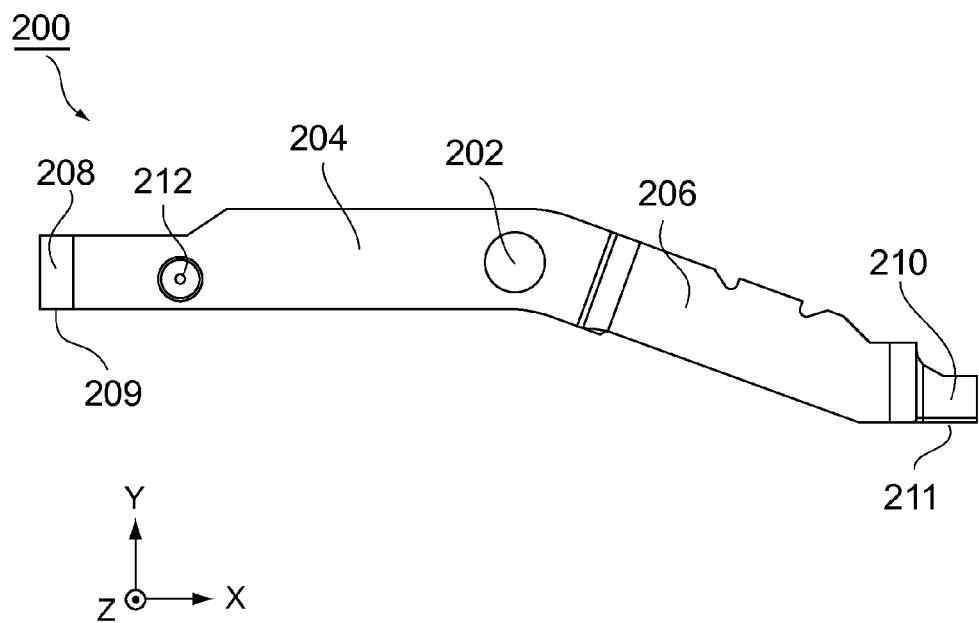
FIG. 8 is a top view showing an eject lever of the connector of FIG. 1.

As shown in FIGS. 3, 5 and 8, the eject lever 200 has a pivot hole (fulcrum portion) 202 formed in the vicinity of the positive X-side end of the first arm 204. The fulcrum portion 202 according to the present embodiment is a circular hole piercing the eject lever 200 in the Z-direction. The fulcrum portion 202 located in the vicinity of the middle part of the eject lever 200 in the X-direction. The fulcrum portion 202 is mated with the pivot portion 106 of the housing 100 so that the eject lever 200 is attached to the housing 100 in a pivotable manner. The negative X-side end of the first arm 204 is bent to extend downward so that the first arm 204 is formed with a pressing portion 208. The pressing portion 208 has a point-of-action portion (working portion) 209. The point-of-action portion 209 has a planar shape perpendicular to the Y-direction. The eject lever 200 is provided with a second temporally holding portion (temporally holding portion) 212 extending upward. The second temporally holding portion 212 is formed between the fulcrum portion 202 and the point-of-action portion 209.

The first arm 204 and the second arm 206 have a step formed therebetween so that the second arm 206 extends in a position which is higher than the first arm 204 in the Z-direction. The positive X-side end of the second arm 206 is bent to extend downward. The downward extending part of the second arm 206 has a leading end which is formed with an operated portion 210. The operated portion 210 has a board-like shape parallel to the XY-plane. The operated portion 210 has a power-point portion (force-applied portion) 211. The power-point portion 211 has a planar shape perpendicular to the Y-direction.

Figure 12:
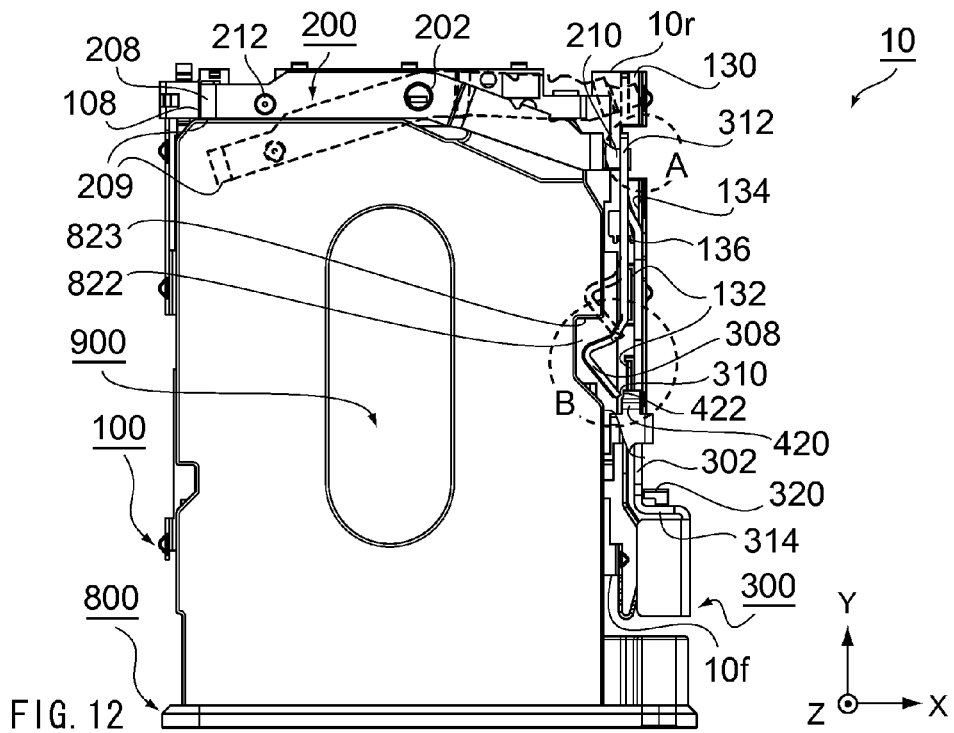
FIG. 12 is a top view showing the connector of FIG. 1 under the inserted state, wherein the cover is not illustrated except the vicinity of a stopper of the cover, and wherein the dashed lines show the eject lever, an operating portion of the eject bar and a lock portion of the eject bar under a state where the eject lever is moved to an eject position.

As can be seen from FIGS. 5 and 12, under the inserted state of the tray 800, the pressing portion 208 is received in the ditch 108 so that the point-of-action portion 209 faces the tray 800 in the Y-direction. In other words, the point-of-action portion 209 is located at an accommodating position which is between the rear end 10r of the connector 10 and the accommodating portion 12 in the Y-direction (i.e. located at back side of the accommodating portion 12 in the positive Y-direction) under the inserted state of the tray 800. When the point-of-action portion 209 is located at the accommodating position, the power-point portion 211 is located at a position which is nearer to the front end 100f of the housing 100 (i.e. the front end 10f of the connector 10) than the point-of-action portion 209 in the Y-direction.

The eject lever 200 which is attached to the housing 100 is pivotable on the fulcrum portion 202. In detail, the power-point portion 211 is pivotable on the fulcrum portion 202 and movable along the positive Y-direction. The point-of-action portion 209 is movable from the accommodating position to an eject position (a position illustrated by dashed lines in FIG. 12) located inside of the accommodating portion 12 when the power-point portion 211 moves along the positive Y-direction. According to the present embodiment, a distance between the fulcrum portion 202 and the power-point portion 211 is substantially equal to a distance between the fulcrum portion 202 and the point-of-action portion 209. Accordingly, a moving distance of the power-point portion 211 along the positive Y-direction is roughly same to a moving distance of the point-of-action portion 209 along the negative Y-direction.

As shown in FIGS. 3 and 5, the eject bar 300 according to the present embodiment is attached to the positive X-side of the housing 100 from above the housing 100 and the eject lever 200. The eject bar 300 roughly has a bar-like shape extending in the Y-direction. The eject bar 300 has a body portion 302, a resilient portion 306, a lock portion 308 and an enclosing portion 316.

The body portion 302 extends in the Y-direction so as to pass through the guide channel 133 of the housing 100. More specifically, the body portion 302 is interposed between the positive X-side surface of the housing 100 and the guide portion 132 so that a movement in the X-direction is regulated while a movement in the Y-direction is allowed. In other words, the guide portion 132 is configured to guide the eject bar 300 so that the eject bar 300 is movable along the Y-direction.

Figure 9:
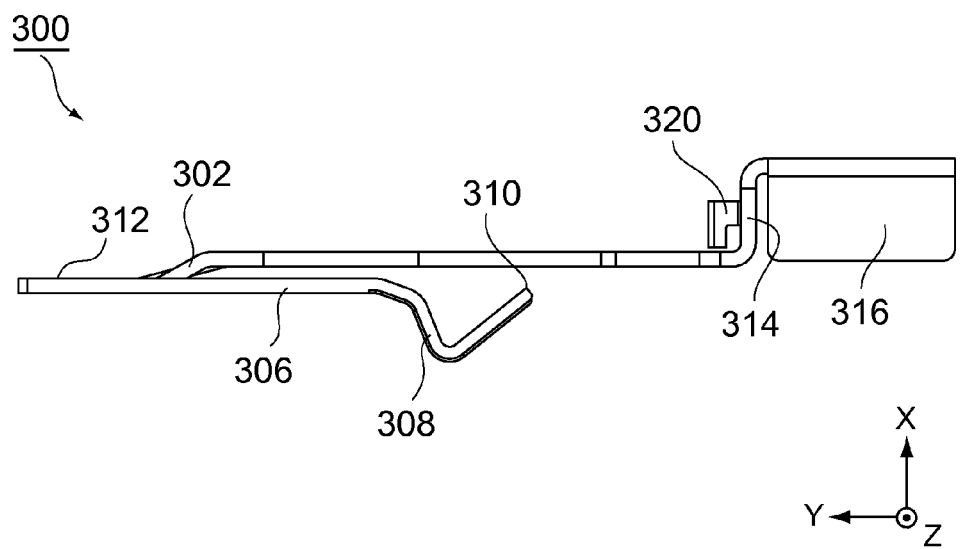
FIG. 9 is a top view showing an eject bar of the connector of FIG. 1.
Figure 10:
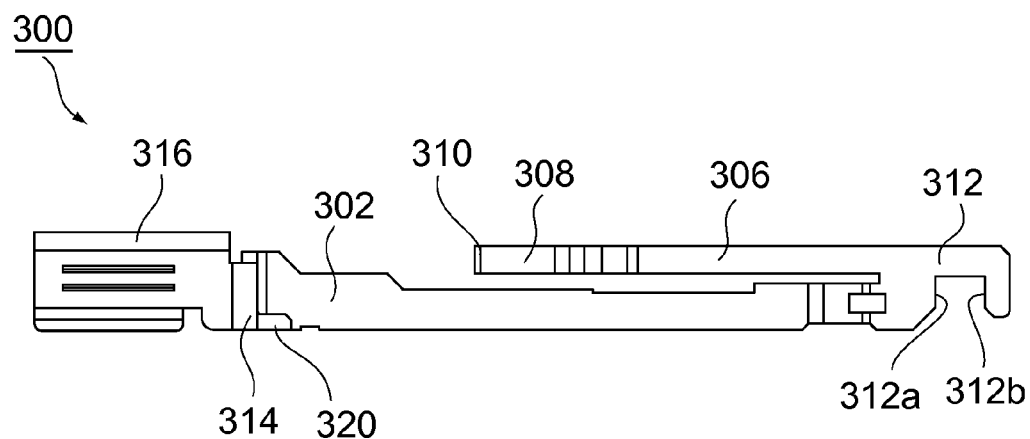
FIG. 10 is a side view showing the eject bar of FIG. 9.

As shown in FIGS. 3, 9 and 10, the negative Y-side end of the body portion 302 is bent to extend outward of the housing 100 so that the eject bar 300 is formed with a pressed portion 314. The pressed portion 314 has a flat board-like shape perpendicular to the Y-direction. The positive Y-side end of the body portion 302 is gently bent inward of the housing 100. The inward bent part of the body portion 302 has a leading end which is formed with an operating portion 312. In other words, the eject bar 300 comprises the body portion 302 extending along the positive Y-direction from one of opposite ends of the pressed portion 314 in the X-direction. The operating portion 312 is provided on the body portion 302.

As can be seen from FIGS. 2 and 5, the eject bar 300 is moved along the positive Y-direction when the pressed portion 314 is pressed along the positive Y-direction by the pin 700.

Figure 13:
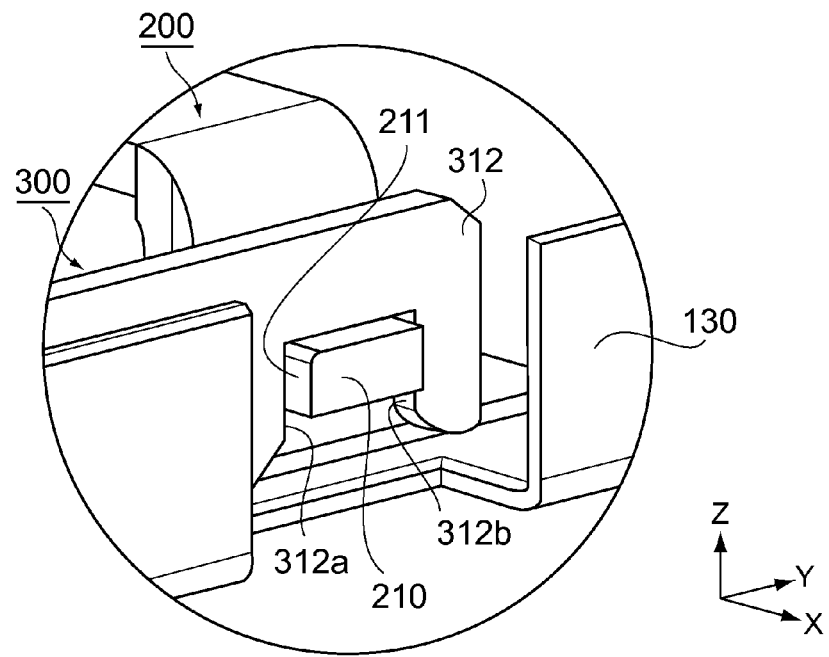
FIG. 13 is a partially enlarged, perspective view showing about the operating portion (i.e. parts indicated by dashed lines A) of the eject bar of the connector of FIG. 12, wherein the cover is not illustrated.

As shown in FIGS. 3, 10 and 13, the operating portion 312 has a hook shape. In detail, the operating portion 312 has a first pressing surface 312a and a second pressing surface 312b facing each other in the Y-direction. When the eject bar 300 is attached to the housing 100, the operating portion 312 is coupled with the eject lever 200 so as to interpose the operated portion 210 between the first pressing surface 312a and the second pressing surface 312b. As can be seen from the above description, the eject lever 200 is configured to be operated by the eject bar 300. According to the present embodiment, the first pressing surface 312a and the power-point portion 211 are in contact with each other in the Y-direction under a state where the eject bar 300 is coupled with the eject lever 200. The first pressing surface 312a and the power-point portion 211 may be spaced from each other so as to face each other in the Y-direction. In other words, the eject bar 300 may be arranged so that the operating portion 312 presses the power-point portion 211 in the positive Y-direction when the eject bar 300 is moved along the positive Y-direction. However, if a gap between the first pressing surface 312a and the power-point portion 211 becomes large, a position of the eject bar 300 in the Y-direction might become unstable. Therefore, it is preferred to configure similar to the present embodiment.

As shown in FIGS. 3, 5, 9 and 10, the lock portion 308 according to the present embodiment is formed integrally with the eject bar 300. More specifically, the resilient portion 306 extends forward (i.e. toward the pressed portion 314) from the negative Y-side end of the operating portion 312 (i.e. extends in parallel to the body portion 302 in the X-direction) so as to resiliently support the lock portion 308. The resilient portion 306 and the lock portion 308 are located at a position which is higher than the body portion 302 in the Z-direction. As seen along the Z-direction, the lock portion 308 has a shape which curves toward the inside of the housing 100. In detail, the lock portion 308 extends toward the outside of the housing 100 so as to be formed with a leading end after extending from the resilient portion 306 toward the inside of the housing 100 in a direction oblique to the Y-direction. The leading end of the lock portion 308 is formed with a received portion 310.

As shown in FIG. 5, the resilient portion 306 extends above the first regulating portion 136 of the housing 100. Moreover, as can be seen from FIGS. 1 and 5, the resilient portion 306 is covered with the cover 400 from above. Accordingly, the lock portion 308 is movable substantially only in the X-direction.

As can be seen from FIGS. 5 and 12, the lock portion 308 moves along the positive Y-direction from a lock position (a position illustrated by solid lines in FIG. 12) to an unlock position (a position illustrated by dashed lines in FIG. 12) when the eject bar 300 moves along the positive Y-direction. The lock portion 308 is located at the lock position when the point-of-action portion 209 is located at the accommodating position. The lock portion 308 is located at the unlock position when the point-of-action portion 209 is located at the eject position.

Figure 17:
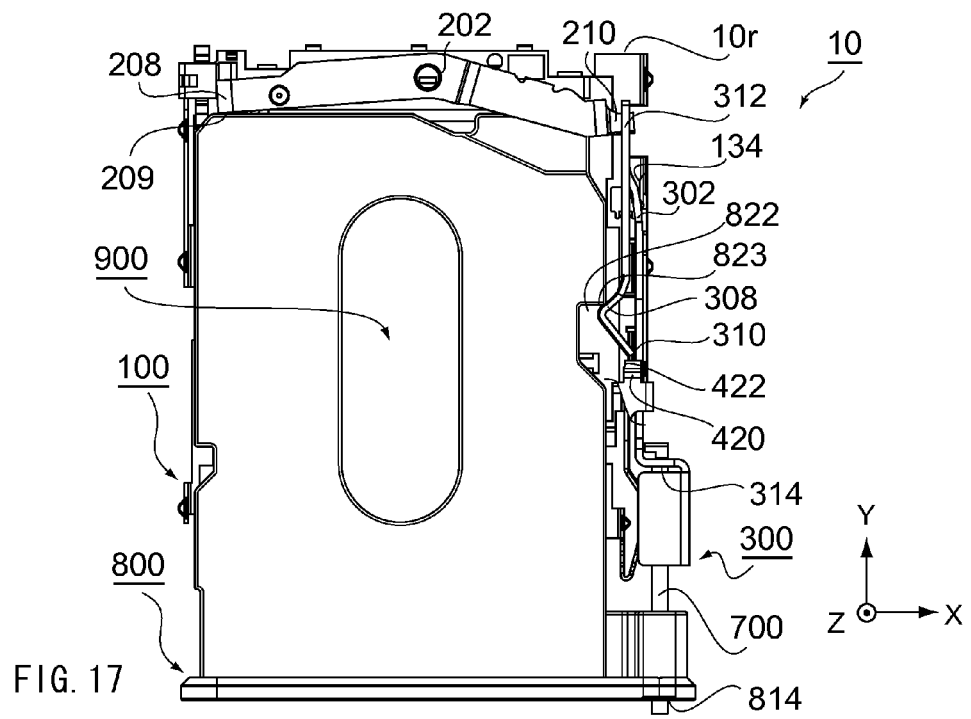
FIG. 17 is a top view showing the connector of FIG. 1 in a state where the eject bar is moved in an insert direction, wherein the cover is not illustrated except the vicinity of the stopper.
Figure 18:
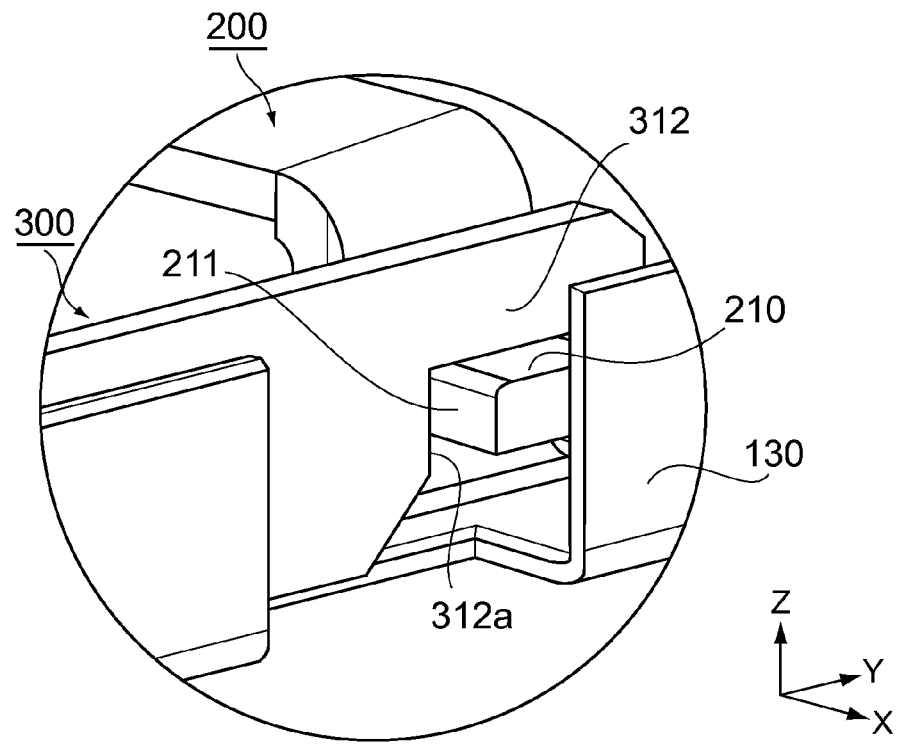
FIG. 18 is a partially enlarged, perspective view showing about the operating portion (i.e. parts indicated by dashed lines A) of the eject bar of the connector of FIG. 12 in a state where the eject bar is further moved in the insert direction, wherein the cover is not illustrated.

As can be seen from FIGS. 12 and 17, when the lock portion 308 is located at the unlock position, the body portion 302 is pressed by the first temporally holding portion 134 toward the inside of the housing 100 so that the body portion 302 is deformed. Accordingly, the eject bar 300 is temporally held by the friction force between the body portion 302 and the first temporally holding portion 134. In other words, the connector 10 according to the present embodiment comprises the temporally holding portion 134 which holds the eject bar 300 when the lock portion 308 is located at the unlock position. The eject bar 300 held by the temporally holding portion 134 is prevented from moving along the negative Y-direction so that the lock portion 308 is kept at the unlock position.

As shown in FIGS. 3, 5, 9 and 10, the enclosing portion 316 is provided so as to be located forward of the pressed portion 314. The enclosing portion 316 encloses the first switch 138 from above and from one of sides in the X-direction.

As shown in FIGS. 9 and 10, the eject bar 300 is provided with a deformation-preventing portion 320. In detail, the deformation-preventing portion 320 is provided at a lower end of the pressed portion 314. The deformation-preventing portion 320 protrudes in the positive Y-direction from a middle part of the pressed portion 314 in the X-direction while extending toward the body portion 302 in the X-direction. The deformation-preventing portion 320 and the body portion 302 are brought into abutment with each other when the pressed portion 314 is pressed excessively so that the eject bar 300 is prevented from being deformed and damaged. According to the present embodiment, the deformation-preventing portion 320 and the body portion 302 are spaced in the X-direction. However, the deformation-preventing portion 320 may be in contact with the body portion 302.

Figure 11:
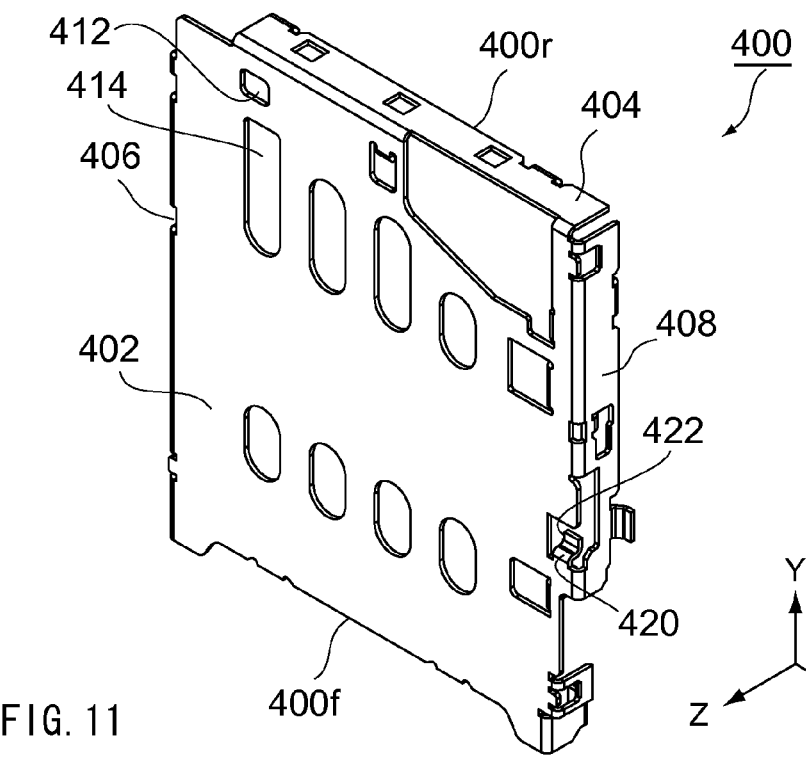
FIG. 11 is a perspective view showing the cover of the connector of FIG. 1.

As shown in FIGS. 1, 3 and 11, the cover 400 according to the present embodiment is attached to the housing 100 from above the housing 100, the eject lever 200 and the eject bar 300. The cover 400 extends in both the X-direction and the Y-direction so as to have a front end 400f and a rear end 400r at opposite ends in the Y-direction. In detail, the cover 400 has an rectangular upper surface 402 which extends in the XY-plane, a rear surface 404 which is bent to extend downward from the vicinity of the rear end 400r of the upper surface 402, and a first side surface 406 and a second side surface 408 which are bent to extend downward from the vicinities of opposite side portions of the upper surface 402, respectively, so that the cover 400 has a box-like shape which opens downward and toward the front end 400f. The rear end 400r, the first side surface 406 and the second side surface 408 are put on the housing 100 so as to surround the housing 100.

The upper surface 402 of the cover 400 is partially cut and bent to extend downward so as to be formed with an engaging protrusion 410, two second regulating portions 416 and a stopper 420. In addition, the upper surface 402 of the cover 400 is provided with a holding hole 412 and a hole 414. The hole 414 is located in the vicinity of the holding hole 412.

The engaging protrusion 410 has a shape corresponding to the engaging slot 107 of the pivot portion 106 of the housing 100. The engaging protrusion 410 is fitted in the engaging slot 107 so that the eject lever 200 is prevented from being removed.

As can be seen from FIGS. 1 and 3, the second regulating portions 416 are located inward of the resilient portion 306 and the operating portion 312 of the eject bar 300 in the X-direction so as to regulate movements of the resilient portion 306 and the operating portion 312 in the negative X-direction.

Figure 14:
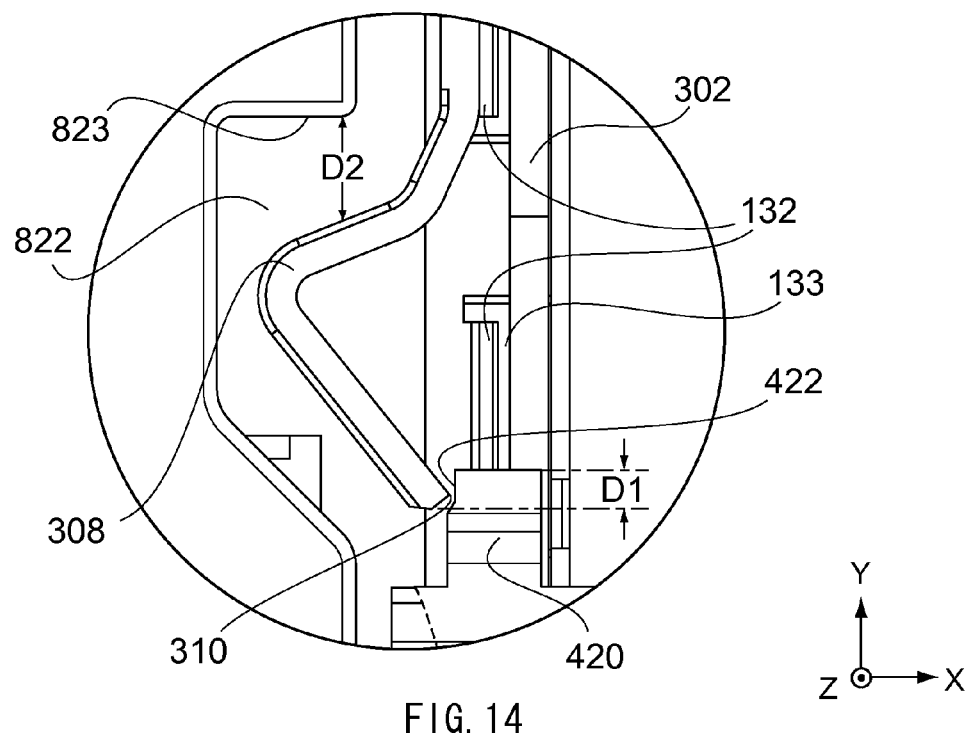
FIG. 14 is a partially enlarged, top view showing about the lock portion (i.e. parts indicated by dashed lines B) of the eject bar of the connector of FIG. 12, wherein the cover is not illustrated except the vicinity of the stopper.
Figure 15:
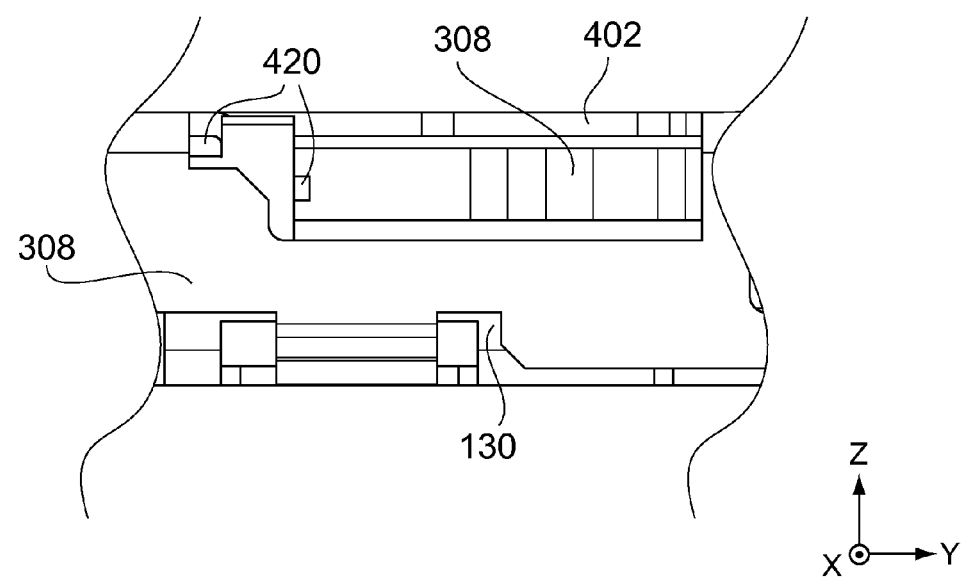
FIG. 15 is a partially enlarged, side view showing about the lock portion of the eject bar of the connector (i.e. parts indicated by dashed lines B) of FIG. 12.

As shown in FIGS. 11, 12 and 14, the stopper 420 is formed in the vicinity of the second side surface 408 of the cover 400 in the X-direction. The stopper 420 is located above the body portion 302 of the eject bar 300 in the Z-direction. The stopper 420 extends downward from the upper surface 402 so as to have a leading end while extending toward the rear end 400r. The leading end of the stopper 420 is partially cut so that the stopper 420 is formed with a receiving portion 422.

As shown in FIGS. 12 and 14, when the lock portion 308 is located at the lock position, the received portion 310 of the lock portion 308 is located at the same position as the receiving portion 422 of the stopper 420. When the lock portion 308 is located at the unlock position, the received portion 310 is moved in the positive Y-direction to be located between the rear end 10r and the receiving portion 422 of the stopper 420. In other words, the stopper 420 faces the received portion 310 of the lock portion 308 in the X-direction when the lock portion 308 is located at the lock position. The stopper 420 is located in front of the lock portion 308 in the positive Y-direction (i.e. located between the lock portion 308 and the front end 10f of the connector 10 in the Y-direction) when the lock portion 308 is located at the unlock position.

As can be seen from FIGS. 1 and 12, each of the holding hole 412 and the hole 414 is configured to temporally hold the second temporally holding portion 212. More specifically, when the point-of-action portion 209 of the eject lever 200 is located at the accommodating position (see FIG. 12), the second temporally holding portion 212 protrudes in the holding hole 412 so that the eject lever 200 is prevented from unintentionally pivoting. Similarly, when the point-of-action portion 209 is located at the eject position (see dashed lines in FIG. 12), the second temporally holding portion 212 protrudes in the hole 414.

As shown in FIG. 12, the lock portion 308 is located at the lock position under the inserted state where the tray 800 is inserted in the connector 10 which is configured as described above. When the lock portion 308 is located at the lock position under the inserted state, (at least) a part of the lock portion 308 is located inside of the recess 822 of the tray 800. Moreover, the lock portion 308 is located between the wall 823 of the recess 822 and the front end 10f of the connector 10 in the Y-direction (i.e. located in front of the wall 823 in the positive Y-direction). In other words, when the tray 800 is in the inserted state, the wall 823 is located between the lock portion 308 and the rear end 10r of the connector 10 in the positive Y-direction.

As can be seen from FIGS. 6 and 7, the second part of the second switch 140 is pressed downward by the tray 800 in the inserted state to be apart from the first part of the second switch 140. Accordingly, the second switch 140 is in Off state under the inserted state so that it is possible to detect that the tray 800 is accommodated in the accommodating portion 12.

Figure 16:
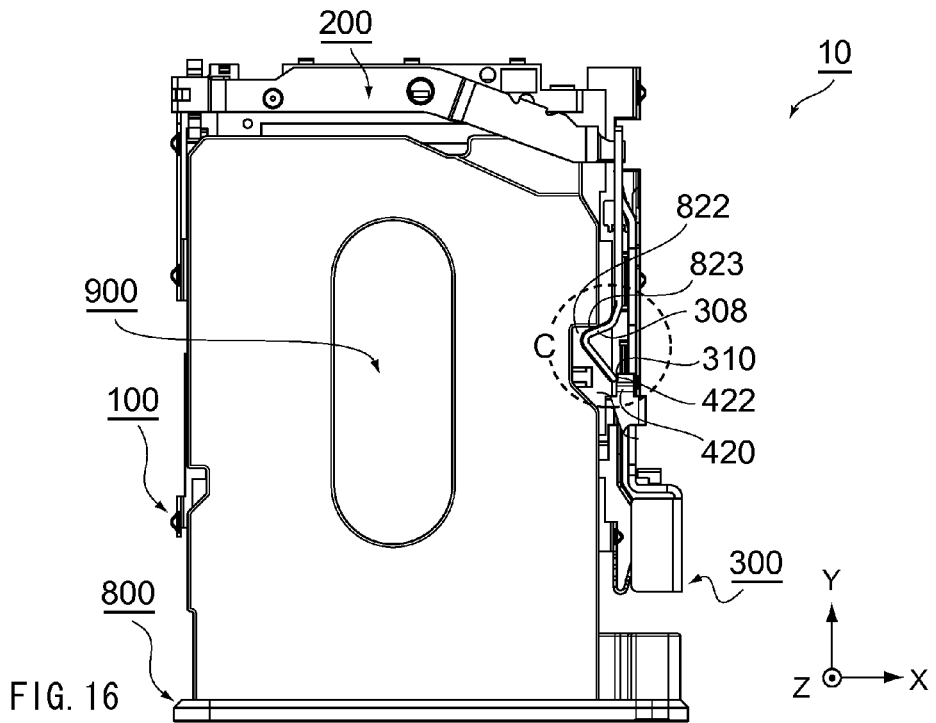
FIG. 16 is a top view showing the connector of FIG. 1 in a state where the tray is pulled along an eject direction, wherein the cover is not illustrated except the vicinity of the stopper.
Figure 19:
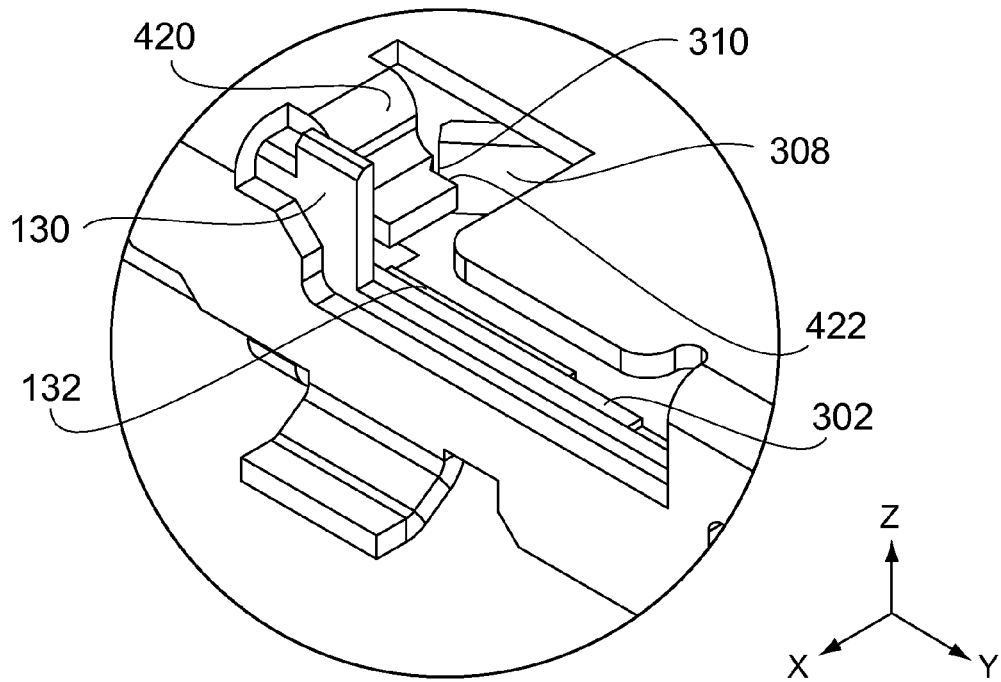
FIG. 19 is a partially enlarged, perspective view showing about the lock portion (i.e. parts indicated by dashed lines C) of the eject bar of the connector of FIG. 16.
Figure 20:
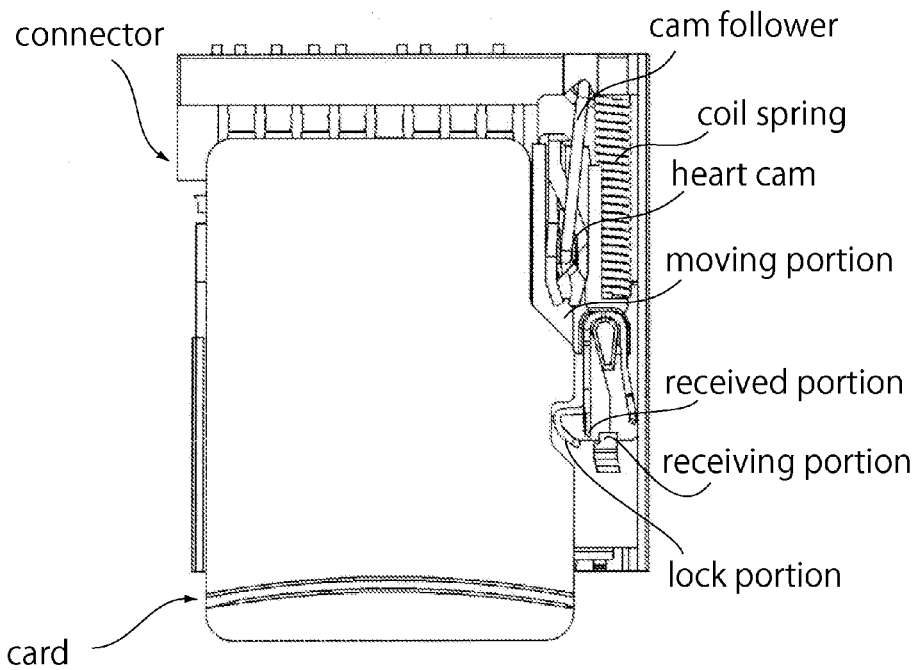
FIG. 20 is a top view showing an example of existing eject-mechanisms.
Figure 21:
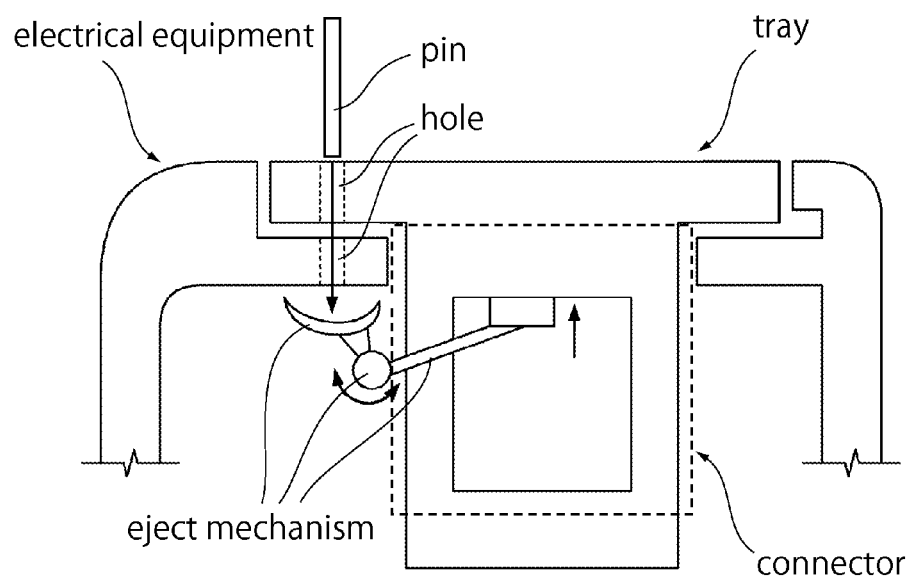
FIG. 21 is a schematic view showing another example of existing eject-mechanisms.
Figure 22:
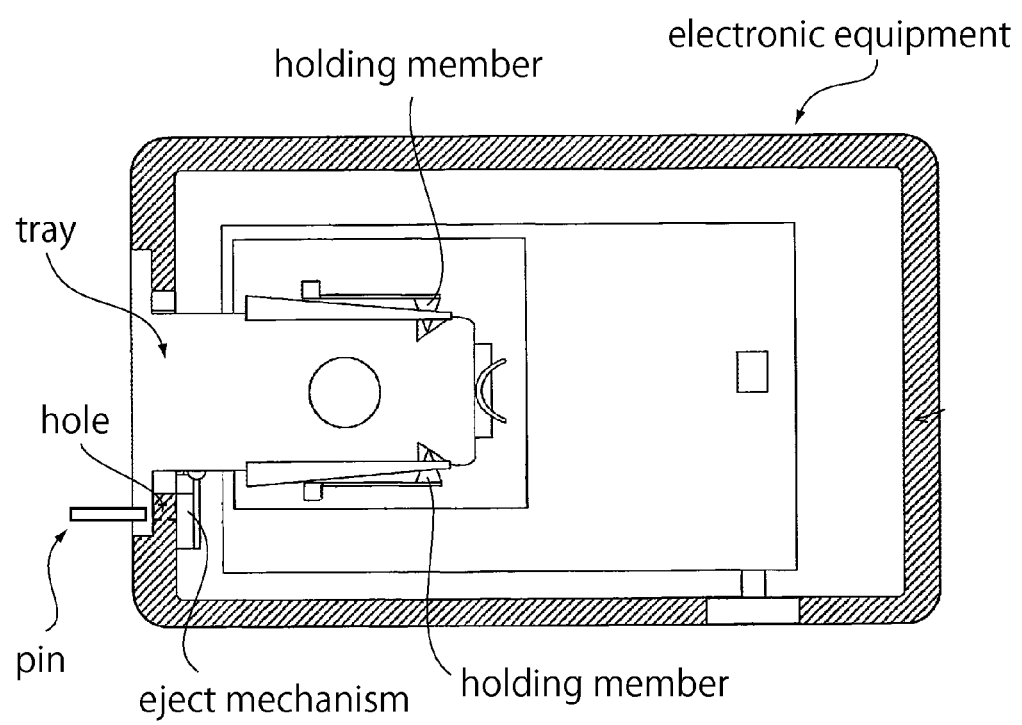
FIG. 22 is a cross-sectional view showing yet another example of existing eject-mechanisms.

As shown in FIGS. 16 and 19, when the tray 800 in the inserted state is pulled to be moved along the negative Y-direction without operating the eject bar 300, the wall 823 is brought into abutment with the lock portion 308. This abutment moves the lock portion 308 in the positive X-direction. Then, the received portion 310 of the moved lock portion 308 is caught by the receiving portion 422 of the stopper 420 while the abutment of the lock portion 308 with the wall 823 is kept. Accordingly, the lock portion 308 is received and stopped by the stopper 420 so that the tray 800 is prevented from being ejected. As can be seen from the above description, according to the present embodiment, the tray 800 comprises the wall 823 which functions as the ejection-prevent portion 823 so that it is possible to hold the tray 800 more securely.

As shown in FIG. 17, when the pressed portion 314 of the eject bar 300 is pressed by the pin 700 which is inserted through the guide hole 814 under the inserted state, the eject bar 300 is moved along the positive Y-direction. When the eject bar 300 is moved along the positive Y-direction under the inserted state, the eject lever 200 presses and moves the tray 800 in the negative Y-direction. In detail, the point-of-action portion 209 of the eject lever 200 is moved from the accommodating position toward the eject position so as to press and move the tray 800 in the negative Y-direction. In the meantime, the lock portion 308 moves toward the unlock position to be brought into abutment with the wall 823 of the tray 800. The lock portion 308 in abutment with the wall 823 moves in the positive X-direction without being stopped by the stopper 420 so that the tray 800 is ejected. According to the present embodiment, it is possible to eject the tray 800 with a relatively small force by such a single operation that the eject bar 300 is pressed in the positive Y-direction.

As can be seen from FIGS. 1 and 12, when the point-of-action portion 209 is moved to the eject position, the second temporally holding portion 212 passes under the upper surface 402 of the cover 400 to project upward through the hole 414. Accordingly, an operator can get a click-feeling so that it is possible to know that the tray 800 is ejected.

As can be seen from FIG. 12, when the eject bar 300 moves a predetermined distance (D) in the positive Y-direction, the tray 800 moves the predetermined distance (D) in the negative Y-direction. Accordingly, as can be seen from FIG. 14, it is necessary that the received portion 310 of the lock portion 308 is moved beyond the receiving portion 422 of the stopper 420 before the lock portion 308 is brought into abutment with the wall 823 in order that the received portion 310 is not received by the receiving portion 422 when the lock portion 308 abutting on the wall 823 is moved in the positive X-direction. In order to configure as described above, a distance (D2) between the wall 823 and the lock portion 308 in the Y-direction is required to be larger than another distance (D1) between the stopper 420 and the lock portion 308 in the Y-direction when the lock portion 308 is located at the lock position under the inserted state. In other words, it is necessary to configure so that the D2 is larger than the D1 (i.e. D2>D1). Moreover, according to the present embodiment, the received portion 310 and the wall 823 are moved the same distance so as to approach each other. Accordingly, the D2 is required to be more than or equal to twice of the D1. In other words, the minimum value of the D2 is twice of the D1. On the other hand, there is no particular restriction about the maximum value of the D2. However, if the distance (D2) between the wall 823 and the lock portion 308 is too large, the tray 800 moves largely (or unstably) when the tray 800 is forced to be removed. Accordingly, it is preferred that the D2 is not too larger than twice of D1.

As can be seen from FIGS. 6 and 17, when the pin 700 presses the pressed portion 314, the movable portion 138m of the first switch 138 is brought into abutment with the pin 700. The movable portion 138m pressed by the pin 700 is moved in the negative X-direction so as to be brought into contact with the fixed portion 138s. Accordingly, the first switch 138 becomes On-state so that it is possible to detect that the eject operation is begun.

As can be seen from FIGS. 12 and 17, when the tray 800 is ejected, the eject bar 300 is temporally held by the first temporally holding portion 134 at a position where the eject bar 300 is pushed into. Accordingly, the lock portion 308 is kept at the unlock position. If the tray 800 is inserted into the connector 10 again, the lock portion 308, which is brought into abutment with a side of the tray 800, moves in the positive X-direction without being received by the stopper 420. If the tray 800 is kept to be inserted, the tray 800 arrives at the inserted state. In the meantime, the point-of-action portion 209 is pressed by the tray 800 to return to the accommodating position from the eject position while the operated portion 210 moves in the negative Y-direction. Accordingly, the first pressing surface 312a of the eject bar 300 is pressed by the power-point portion 211 (see FIG. 13) so that the eject bar 300 is moved in the negative Y-direction. As a result, the lock portion 308 moves to the lock position.

As can be seen from FIGS. 1 and 12, when the point-of-action portion 209 is moved to the accommodating position, the second temporally holding portion 212 passes under the upper surface 402 of the cover 400 to project upward through the holding hole 412. Accordingly, an operator can get a click-feeling so that it is possible to know that the tray 800 is accommodated.

As can be seen from FIGS. 12 and 13, when the lock portion 308 is located at the unlock position in a state where the tray 800 is ejected, it is possible to pull the eject bar 300 along the negative Y-direction. If the eject bar 300 is pulled along the negative Y-direction, the operated portion 210 of the eject lever 200 is pressed by the second pressing surface 312b to be moved in the negative Y-direction. Thus, the point-of-action portion 209 moves to the accommodating portion. As a result, the lock portion 308 is located at the lock position so that it is impossible to insert the tray 800 into the connector 10. However, it is possible to move the lock portion 308 to the unlock position by pressing the eject bar 300 in the positive Y-direction.

As shown in FIG. 14, according to the present embodiment, the received portion 310 and the receiving portion 422 is designed to have a slight gap therebetween when the lock portion 308 is located at the lock position. However, the received portion 310 and the receiving portion 422 may be in contact with each other when the lock portion 308 is located at the lock position.

As can be seen from the above description, an eject mechanism according to the present embodiment is formed with relatively small number of members (specifically, by the eject lever 200 and the eject bar 300). In other words, the tray 800 is ejectable by relatively small number of members. Accordingly, it is possible to configure the eject mechanism without using a large space.

According to the present embodiment, the eject bar 300 and the portions directly related to the eject bar 300 are placed at the positive X-side of the connector 10. The eject bar 300 may be placed at one of the opposite sides of the connector 10. However, in order to reduce the size (i.e. the width) of the connector 10 in the X-direction, it is preferred that the eject bar 300 is arranged, similar to the present embodiment, at the side where the contacts 110 are not provided.

Although the ejection-prevent portion 823 according to the present embodiment is the far side wall 823 of the recess 822 formed on the tray 800, the ejection-prevent portion 823 may be another portion of the tray 800. For example, the ejection-prevent portion 823 may be formed so as to protrude from a side of the tray 800. However, in order to reduce the width of the connector 10 in the X-direction, it is preferred to configure similar to the present embodiment.

Although the lock portion 308 according to the present embodiment is formed integrally with the eject bar 300, it is possible to form the lock portion 308 and the eject bar 300 from different members. Moreover, the lock portion 308 may be formed integrally with the eject lever 200. For example, the resilient portion 306 may be formed to extend in the negative Y-direction from a part of the second arm 206, which is located in the vicinity of the operated portion 210. However, considering the easiness of the production, it is preferred to configure similar to the present embodiment.

The object according to the present embodiment is a tray on which a card is mountable. However, the object of the present invention is not limited to a tray. The object may be, for example, a card itself. In other words, this invention is applicable to a connector into which a card is directly inserted without mounted on a tray. In this case, the card may be formed with, for example, a recess (see the recess 822 of the tray 800). In this case, a front wall or a tube portion (see the front wall 810 and the tube portion 812 of the tray 800) may be unnecessary.

The present application is based on a Japanese patent applications of JP2011-188672 filed before the Japan Patent Office on Aug. 31, 2011, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector into which an object having an ejection-prevent portion is insertable along an insert direction toward a rear end of the connector, the object being ejectable from the connector along an eject direction opposite to the insert direction, the connector comprising:
   an eject bar movable along the insert direction;
   an eject lever configured to be operated by the eject bar;
   a lock portion movable in a width direction perpendicular to the insert direction; and
   a stopper;
   wherein:
   when the eject bar moves along the insert direction, the lock portion moves along the insert direction from a lock position where the lock portion faces the stopper in the width direction to an unlock position which is between the stopper and the rear end of the connector in the insert direction;

when the object is in an inserted state where the object is inserted in the connector, the ejection-prevent portion of the object is located between the lock portion and the rear end of the connector in the insert direction;

when the object in the inserted state is moved along the eject direction without operating the eject bar, the ejection-prevent portion is brought into abutment with the lock portion, the abutment moves the lock portion in the width direction, and the moved lock portion is received and stopped by the stopper so that the object is prevented from being ejected; and when the eject bar is moved along the insert direction under the inserted state, the eject lever presses and moves the object in the eject direction while the lock portion moves toward the unlock position to be brought into abutment with the ejection-prevent portion, and the lock portion in abutment with the ejection-prevent portion moves in the width direction without being stopped by the stopper so that the object is ejected.

2. The connector as recited in claim 1, wherein the lock portion is formed integrally with the eject bar.

3. The connector as recited in claim 1, the connector further comprising a guide portion configured to guide the eject bar so that the eject bar is movable along the insert direction.

4. The connector as recited in claim 3, the connector further comprising a temporally holding portion which holds the eject bar when the lock portion is located at the unlock position.

5. The connector as recited in claim 1, the connector further comprising a cover, the stopper being formed on the cover.

6. The connector as recited in claim 1, wherein:
the object has a recess formed on a side thereof in the width direction, the recess being recessed in the width direction so that the object is formed with a wall located at far side of the recess in the insert direction, the wall functioning as the ejection-prevent portion; and
at least a part of the lock portion is located inside of the recess when the lock portion is located at the lock position.

7. The connector as recited in claim 1, wherein a distance between the ejection-prevent portion and the lock portion in the insert direction is more than or equal to twice of another distance between the stopper and the lock portion in the insert direction when the lock portion is located at the lock position under the inserted state.

8. The connector as recited in claim 1, the connector further comprising an accommodating portion configured to accommodate the object under the inserted state;
wherein:
the eject lever has a fulcrum portion, a power-point portion and a point-of-action portion, the power-point portion being pivotable on the fulcrum portion and movable along the insert direction, the point-of-action portion being movable from an accommodating position located between the rear end of the connector and the accommodating portion to an eject position located inside of the accommodating portion when the power-point portion moves along the insert direction;
the eject bar has a pressed portion and an operating portion, the eject bar being moved along the insert direction when the pressed portion is pressed, the eject bar being arranged so that the operating portion presses the power-point portion in the insert direction when the eject bar is moved along the insert direction; and
the lock portion is located at the lock position when the point-of-action portion is located at the accommodating position, the lock portion being located at the unlock position when the point-of-action portion is located at the eject position.

9. The connector as recited in claim 8, wherein the eject bar has a body portion, the body portion extending along the insert direction from one of opposite ends of the pressed portion in the width direction, the operating portion being provided at the body portion.

10. The connector as recited in claim 9, wherein the eject bar is provided with a deformation-preventing portion, the deformation-preventing portion protruding in the insert direction from a middle part of the pressed portion in the width direction while extending toward the body portion in the width direction, the deformation-preventing portion and the body portion being brought into abutment with each other when the pressed portion is pressed excessively so that the eject bar is prevented from being deformed.

11. The connector as recited in claim 1, wherein the object comprises a tray on which a card is mountable.

12. The connector as recited in claim 2, wherein the object comprises a tray on which a card is mountable.

13. The connector as recited in claim 3, wherein the object comprises a tray on which a card is mountable.

14. The connector as recited in claim 4, wherein the object comprises a tray on which a card is mountable.

15. The connector as recited in claim 5, wherein the object comprises a tray on which a card is mountable.

16. The connector as recited in claim 6, wherein the object comprises a tray on which a card is mountable.

17. The connector as recited in claim 7, wherein the object comprises a tray on which a card is mountable.

18. The connector as recited in claim 8, wherein the object comprises a tray on which a card is mountable.

19. The connector as recited in claim 9, wherein the object comprises a tray on which a card is mountable.

20. The connector as recited in claim 10, wherein the object comprises a tray on which a card is mountable.

* * * * *